United States Patent Office 3,285,640
Patented Nov. 15, 1966

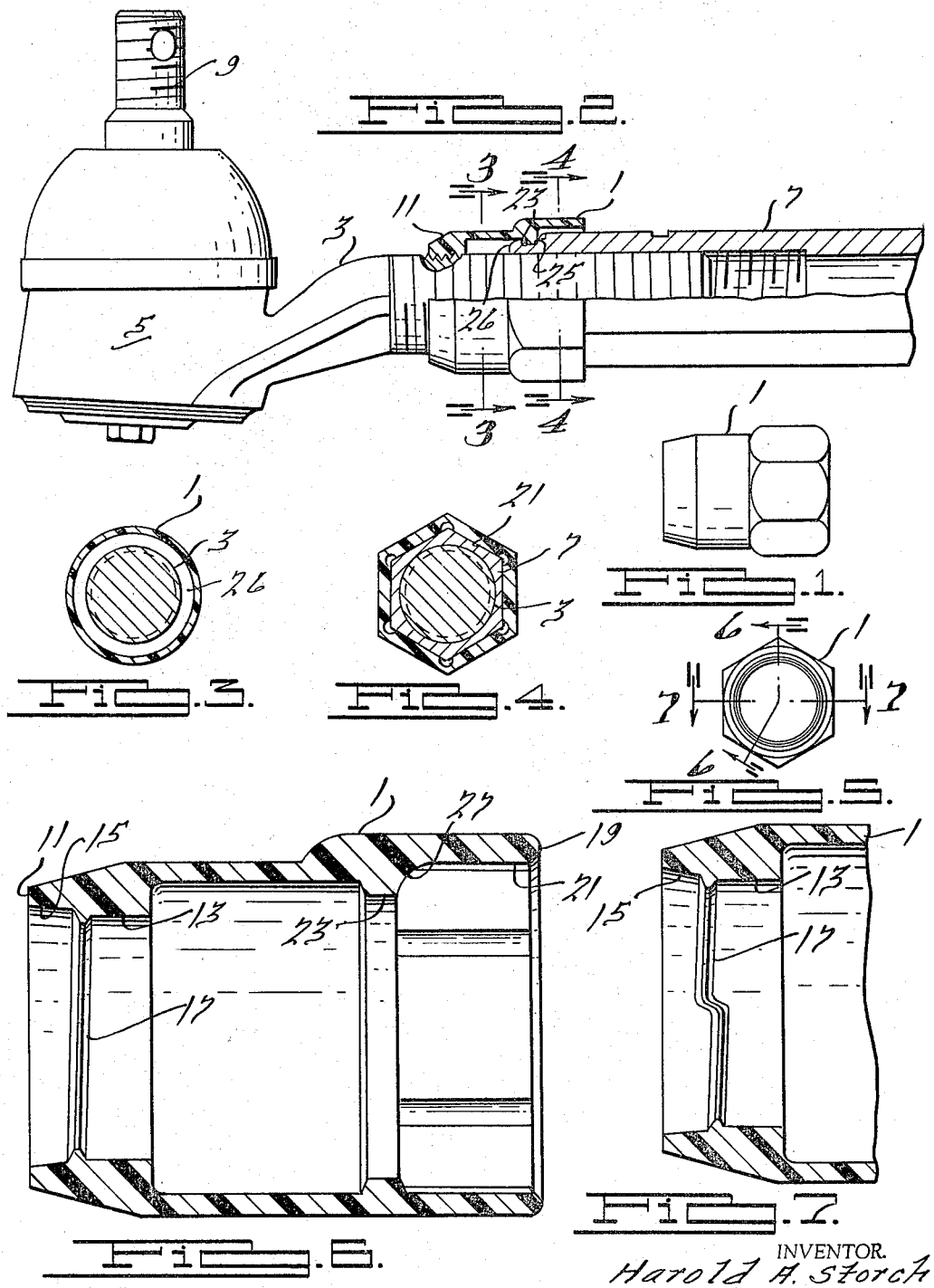

3,285,640
THREADED JOINT AND SEAL THEREFOR
Harold A. Storch, Birmingham, Mich., assignor to Federal Screw Works, Detroit, Mich., a corporation of Michigan
Filed Mar. 16, 1964, Ser. No. 352,037
7 Claims. (Cl. 287—125)

This invention relates to threaded joints and particularly to a threaded joint having a seal between the male and female threaded members of the joint.

The present invention will find use in conjunction with a wide variety of threadedly engaged structural members when it is desired to seal the interengaged threads against contact with water, dirt, salt and other external contaminating and corrosive elements while still permitting relative threading movement. The joint and seal of the present invention is also particularly useful in connection with so-called "self-locking" threaded elements where it is desired to prevent inadvertent or undesired rotation between the threaded parts yet permit such rotation when desired. It will be appreciated that both such situations may exist in numerous types of threaded joints. One such application comprises an adjusting sleeve for an automotive steering linkage which is used between the tie rod and ball joint housing and which is particularly subject to corrosion as the result of mud, salt and the like from the road. It will be appreciated, however, that this particular application is exemplary only.

It is accordingly an object of the present invention to provide an adjustable threaded joint in which the threads are sealed against external corrosive agents.

It is a further object of the present invention to provide a threaded joint of the above character in which a seal between male and female threaded members helps to prevent inadvertent angular movement between said members.

It is a further object of the present invention to provide a seal for a threaded joint adapted to have threads formed therein by the male threaded members as it is threaded thereon and which will thereby frictionally grip the male threaded member.

It is a further object of the present invention to provide a seal and joint of the above character which is self-locking in function and will retain a high percentage of its original self-locking grip after repeated adjustments of the joint.

It is a further object of the present invention to provide a joint of the above type in which the seal securely and frictionally engages both male and female threaded members.

It is another object of the present invention to provide a seal and joint of the above character effective to dampen vibrations, shocks, and the like.

It is still another object of the present invention to provide a threaded automobile steering linkage component which may be conveniently and expeditiously rotated to adjust the linkage and align the wheels of the vehicle.

It is still a further object of the present invention to provide a joint and seal of the above type which are rugged in construction, relatively inexpensive to manufacture, reliable in use, and possess a long useful life.

Other objects and advantages of the present invention will become more apparent from the following detailed description taken in conjunction with the drawings in which:

FIGURE 1 is an elevational view of a seal constructed according to the present invention;

FIG. 2 is a view partly in section and partly in elevation of the joint utilizing the seal of FIGURE 1;

FIG. 3 is a sectional view of the structure of FIG. 2 taken along line 3—3 thereof;

FIG. 4 is a sectional view of the structure of FIG. 2 taken along line 4—4 thereof;

FIG. 5 is a view of the seal of FIG. 1 shown from the left side thereof;

FIG. 6 is an enlarged sectional view of FIG. 5 taken along line 6—6 thereof; and FIG. 7 is an enlarged sectional view of FIG. 5 taken along line 7—7 thereof.

Referring now to the drawings, a seal 1 is shown in FIG. 2 to be connected at one end thereof to a male threaded member 3 while its other end is snugly fitted on one end of a female threaded member 7 which, in turn, threadedly receives the end of male threaded member 3. The male threaded member shown in the drawings is a shank portion of an automotive ball joint housing 5 while the female threaded member is an adjustment sleeve which may be attached at its other end to the tie rod of the conventional automobile. However, it is to be understood that this use is by way of illustration only and the present invention will find use in a variety of threaded joints where it is desired to provide a seal for mating the ends of a male and female threaded member. As shown, stud 9 is supported on the ball joint housing 5 for universal movement with respect thereto and in the conventional automotive use, this stud may be connected to a steering arm or other steering linkage part.

As shown in greater detail in FIGS. 6 and 7, seal 1 comprises a molded or cast generally hollow unitary body made from a substance having a hardness less than that of steel. Nylon, for example, has been found to be a very satisfactory material. One end portion 11 of the seal is designed to receive a threaded stud or other male threaded member in interference fitted relationship therewith. Thus, the end 11 is provided with a reduced diameter bore wall 13 having a chamfered end portion 15, to aid in guiding and receiving the stud or shank end, and at least one helical thread 17 formed at an intermediate portion thereof. As shown, the single thread is a right-hand thread since the threads on the male threaded member are also right-hand threads. Bore wall 13 is designed with a diameter generally equal to the pitch diameter of the threaded male shank to be received therein so that as the seal is placed on shank 3 and rotated relative thereto, the threads in this shank will successively engage single thread 17 and will move the seal axially on the shank 3. As this occurs, additional threads will be formed in seal 1 along bore wall 13 corresponding to the threads formed on shank 3 with this interference fitting relationship between shank 3 and bore 13 of the seal constituting a moistureproof joint. As the threads are formed in bore wall 13, the portion of seal 1 formed with bore wall 13 is placed under a longitudinal tension. This results from the fact that the threads of shank 3 tend to pull each of the threads in the bore wall as it is formed away from the next succeeding thread. Thus, seal 1, after it has been completely assembled on threaded shank 3 as shown in FIG. 2, will be under longitudinal tension and will not be inadvertently threaded relative to male threaded member 3. Seal 1 and shank 3 can, however, be rotated relative to each other when it is desired to adjust the relative axial positions thereof in a manner to be described.

Seal 1 is formed at its other end 19 with an opening 21 of a size and shape to closely but slidably receive and guide female threaded member 7 which is to be threaded on shank 3. To prevent relative rotation between the seal and the female threaded member in the device illustrated, the outer periphery of sleeve 7 and opening 21 are formed correspondingly polygonal; however, any appropriate form may be used. An integral inwardly extending annular flange portion 23 is formed adjacent opening 21 on seal 1 and is adapted to be received in an annular groove 25 formed adjacent and end portion 26 of sleeve 7. The internal diameter of the annular flange is designed slightly smaller than the diameter of groove 25 so that a moistureproof joint is formed therebetween which will, in conjunction with the seal formed between bore 13 and threads of shank 3, provide an effective seal for the engaged threads of the male and female members.

To assemble seal 1 on the sleeve, sleeve end 26 is first inserted within seal end portion 21. This assembly is then placed in an appropriate power press to force annular flange 23 over the sleeve end and into groove 25. As shown in FIG. 6, a rear shoulder 27 formed on annular flange 23 may be tapered to facilitate insertion of sleeve end 26 therein. Seal end portion 11 is then threaded on male threaded member 3 with the threads thereof forming corresponding threads in bore portion 13. Threading movement between seal 1 and shank 3 will continue until the shank is threaded into sleeve 7.

In use, the other end of sleeve 7, which may be connected to an automotive tie rod (not shown), may be threadedly received thereon in such a manner that by simply placing a wrench on the sleeve and turning the same in one direction or the other, the tie rod and ball joint housing may be moved closer together or further apart, respectively. This can be accomplished by making the connection between sleeve 7 and the tie rod a left-hand thread since the threaded connection between shank 3 and the sleeve is shown to be a right-hand thread. If an additional seal member is used on the joint between sleeve 7 and the tie rod, thread 17 would have to be a left-hand thread. To distinguish between the seals which are formed with right and left-hand threads, the seals could be colored accordingly, for example, red and blue, respectively. Further, since the threads of shank 3 exert a longitudinal tension on seal 1 through the threads formed therein, repeated adjustments may be made between the ball joint housing and the tie rod assembly without destroying the sealing or rotation resisting effect.

While a preferred embodiment of the present invention has been shown and described herein, it is to be understood that various additions, substitutions, omissions and modifications may be made thereto without departing from the spirit of the invention as encompassed by the appended claims.

What is claimed is:

1. In a threaded joint, a male member, a female member having an outer surface of polygonal cross-section into which said male threaded member is received and an external annular groove adjacent one end thereof, a sealing member for the interengaging threads of said male and female member, said sealing member comprising a generally elongated hollow body of non-metallic deformable material having a first end portion and a second end portion, said first end portion having a generally cylindrical radially inwardly facing surface of a diameter substantially equal to the pitch diameter of said male threaded member and adapted to have threads formed therein by said male threaded member, said second end portion having a socket of polygonal cross-section adapted to receive said female threaded member in non-rotatable relation therewith, and an annular inwardly extending flange portion formed adjacent the second end portion of said hollow body and adapted to be received in and sealingly engage said annular groove.

2. A sealing member comprising a generally elongated hollow body of non-metallic readily deformable material having a first end portion and a second end portion, said first end portion having a generally cylindrical portion of a diameter substantially equal to the pitch diameter of a male threaded member and adapted to have threads formed therein by said male threaded member, at least one thread formed in said first end portion adjacent said cylindrical portion and adapted to threadedly receive the male threaded member, said second end portion having a socket of polygonal cross-section to receive a female threaded member having an outer surface of polygonal cross-section in non-rotatable relation therewith, and an annular inwardly extending flange portion formed adjacent the second end portion of said hollow body and adapted to be received in and sealingly engage an annular groove formed in the exterior of the female threaded member.

3. In combination, a female threaded member, a male threaded member threaded into said female threaded member and a protector for a joint between said member, said protector comprising a hollow elongated body of resilient synthetic resinous material having a first end portion provided with an opening defined by an inner cylindrical wall into which said male threaded member is rotatably inserted to thereby form threads in said wall whereby said first end portion is operable to sealingly but adjustably grip said male threaded member, and a second end portion nonrotatably receiving said female threaded member and provided with a radially inwardly facing sealing surface, said female threaded member having a surface on the outer periphery thereof engageable by said sealing surface of said second end portion to form a compressively tight seal therebetween.

4. The structure set forth in claim 3, wherein said second end portion has a socket of noncircular cross section engageable with a conforming surface of said female threaded member.

5. The structure set forth in claim 3 wherein at least a portion of the inner cylindrical surface of said female threaded member is of a diameter equal to the pitch diameter of the threads of said male threaded member.

6. The structure set forth in claim 5, wherein said first end portion comprises at least two cylindrical surfaces of different radii and the shoulder defined between said two surfaces is a thread for facilitating threading of said male threaded member into said first end portion.

7. The structure set forth in claim 3 wherein said sealing surface is formed on a radially inwardly projecting annular shoulder of said second end portion and the surface of said female threaded member engageable by said sealing surface lies in an annular groove formed on the outer periphery of said female threaded member.

References Cited by the Examiner

UNITED STATES PATENTS

| 1,193,025 | 8/1916 | Klein | 285—92 |
| 2,424,727 | 7/1947 | Wenk | 285—55 X |
| 2,646,822 | 7/1953 | Ferguson | 285—55 |
| 2,903,283 | 9/1959 | Sweetland | 287—61 |
| 2,933,428 | 4/1960 | Mueller | 285—423 |
| 3,023,033 | 2/1962 | Koch | 285—423 |
| 3,108,826 | 10/1963 | Black | 285—423 |
| 3,141,478 | 7/1964 | Copeland | 285—55 X |

FOREIGN PATENTS

| 7,832 | 4/1903 | Great Britain. |

CARL W. TOMLIN, *Primary Examiner.*

THOMAS F. CALLAGHAN, *Examiner.*

I. B. TALTON, *Assistant Examiner.*